United States Patent

[11] 3,600,560

| [72] | Inventors | Russell N. Gosselin<br>Salem, N.H.;<br>Joseph B. Melanson, Salem, Mass. |
|---|---|---|
| [21] | Appl. No. | 825,846 |
| [22] | Filed | May 19, 1969 |
| [45] | Patented | Aug. 17, 1971 |
| [73] | Assignee | General Tally Computers, Inc.<br>Salem, N.H. |

[54] RATE/TIME COMPUTER
8 Claims, 10 Drawing Figs.

[52] U.S. Cl........................................................ 235/92 ST,
                                              235/92 GA, 235/92 R
[51] Int. Cl......................................................... G06f 7/38
[50] Field of Search............................................. 235/92, 4,
            7, 13.1, 24, 26, 29 TF, 34, 37, 57, 73; 223/23

[56] References Cited
UNITED STATES PATENTS
| 3,448,459 | 6/1969 | Margolis...................... | 235/92 UX |
| 2,555,405 | 6/1951 | Funk............................ | 235/92 |
| 3,003,691 | 10/1961 | Standberg................... | 235/92 |
| 3,021,057 | 2/1962 | Placke et al................. | 235/92 (24) |

Primary Examiner—Maynard R. Wilbur
Assistant Examiner—Joseph M. Thesz, Jr.

ABSTRACT: A rate/time computer which comprises a pulse generator adapted to transmit pulses at various selected frequencies which selected frequencies correspond to preselected monetary values. A plurality of accessory register assemblies are in communication with the pulse generator and may be actuated to respond to one or more of the selected frequencies. If the accessory register assembly is actuated to correspond to two of the pulsed frequencies, then a transmitter located in each accessory register allows a counter disposed within the register to register or count the total accumulated pulses serially within a given preselected time period. If one or more accessory registers are actuated to be responsive to one or more of the selected pulse frequencies from the pulse generator, then at the same time pulses are acknowledged by the accessory register, the pulses are accumulated in a master totalizer so that the total count of all registers being employed may be recorded.

INVENTORS
RUSSELL N. GOSSELIN
JOSEPH B. MELANSON
BY
ATTORNEYS

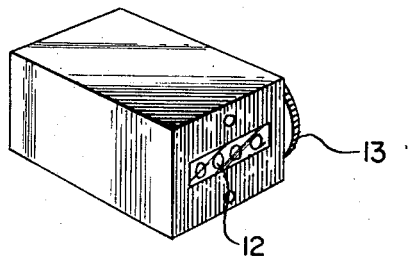
FIG. 3
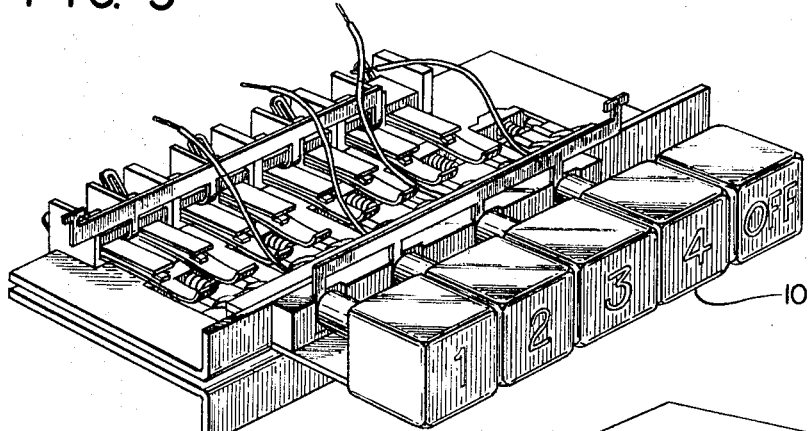
FIG. 2
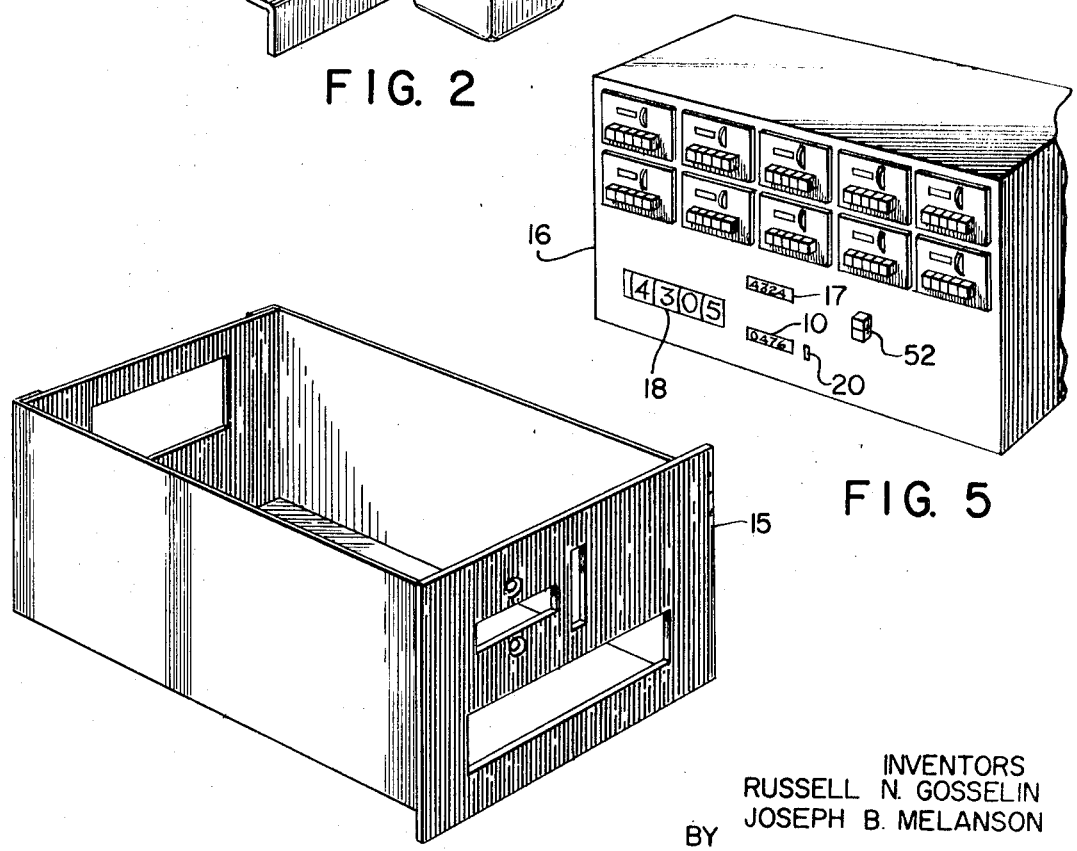
FIG. 5
FIG. 4

RATE/TIME COMPUTER

BACKGROUND OF THE INVENTION

A number of activities require a method for keeping track of certain operations which carry a given rate for a given time period. For example, when an automotive shop charges its customers by the hour of mechanic's time, it is necessary to keep track of the charges on all the automobiles being worked on through the day which may be carried out by individuals which charge varying rates to a particular job. Likewise in bowling alleys, billiard rooms and other game rental activities, it is necessary to keep track of the charges for each customer or group of customers even though a variety of different rates are used and the start and stop times of each activity are random. Wages to be paid to a number of different employees working at different times and wage rates must also be tabulated and computed. The record keeping and tabulation involved in such operations is tedious and subject to error. Mechanical devices do not readily lend themselves to the simultaneous computing of different rates of charges for a plurality of activities. A time-clock punching system is still the most common method employed but this method provides a time value only without reference to rate which must be manually computed and thus subject to error.

A device has now been found for automatically and simultaneously computing monetary totals for a number of activities carrying various monetary rates relative to time periods.

SUMMARY OF THE INVENTION

Essentially the device comprises a pulse generator which generates periodic pulses at a plurality of predetermined frequencies. Each frequency corresponds to a rate. Commencement of an activity selects one of the pulse frequencies, which frequency corresponds to a predetermined rate. Computation of the charge is made at the selected frequency for that activity until completion of action or until a different frequency is selected because of some change in the operation which necessitates a change in the rate. A number of accessory register units are interconnected with the pulse generator. Each register unit is associated with one activity, i.e., one billiard table or one bowling alley, and the total number of activities that can be handled is limited only by the number of accessory register units. Rate computing for a specific activity can be started by a switch on the respective register unit. This switch also selects the rate (pulse frequency) applicable. The rate for the specific activity may also be predetermined by fixed wiring.

More specifically, in the device of the present invention, a pulse generator produces a sequential series of pulses at a predetermined rate. This pulse generator actuates a master control unit which transmits a pulse to a plurality of accessory register units wherein each register unit is directed to a given activity and which is adapted to select one of several predetermined rates. If the pulse frequency generated corresponds to the one activated on the register unit, then a counter mechanism in the unit will be actuated to record a unit of monetary value on the counter. The pulse input to the assembly also actuates another pulse which records the indicated monetary value in a memory bank from which it is recorded, with the monetary values from all of the accessory register units on a daily and permanent counter.

In one embodiment, the pulse generator comprises a disc with a series of holes punched therein which corresponds to the number and frequency of pulses to be emitted which holes are engageable by a plurality of switches. Thus, each hole on the disc corresponds to a preselected monetary value, such as 5 cents. A disc could be punched to provide, say 20 pulses an hour representing 1 dollar an hour. It can be seen that the location and spacing of the holes will permit any combination of pulse frequencies desired. A plurality of microswitches in the form of "fingers" or feeler levers engage the holes so that the switches are tripped as they fall into the holes as the disc rotates. Each microswitch corresponds to a given player (rate), e.g., one player, and is actuated from the accessory register assembly. The microswitch actuates a master control unit by discharging a capacitor into a transistor. This transistor will pulse all accessory register assemblies which have the one player button in. By pulsing these assemblies, a pulse transmitter located in each assembly actuates the counter to record one unit, in the example given, one nickel. The pulse to the assembly also sends a pulse from the drawer to a memory control circuit board which charges a particular capacitor for master permanent and master resettable or daily totalizers. A ring circuit pulsing at a standard rate reads all the capacitors in the memory control circuit in sequence and when it passes a charged capacitor it discharges the capacitor pulsing the master totalizer counters recording the monetary value thereon.

BRIEF DESCRIPTION OF THE DRAWINGS

FIG. 2 is a perspective view of the selection assembly of an accessory register;

FIG. 3 is a perspective view of the register assembly or counter of an accessory register unit;

FIG. 4 is a perspective view of an accessory register cabinet with top and contents removed;

FIG. 5 is a perspective view of a multiple accessory register unit;

Figure 1:
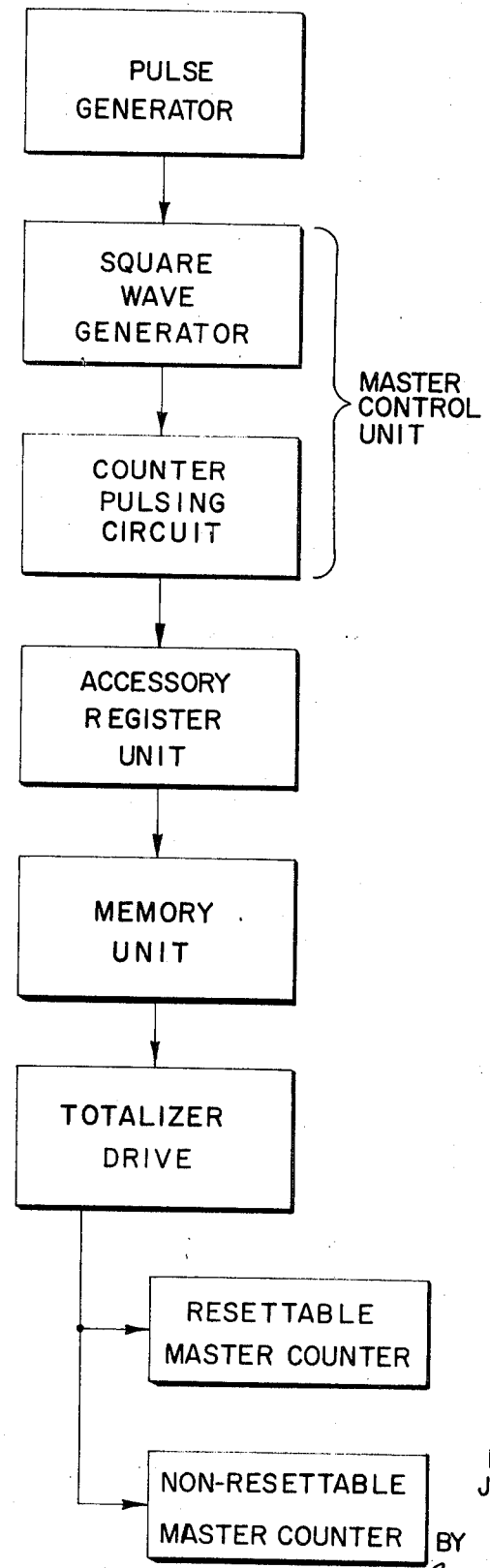
FIG. 1 is a flow diagram illustrating the operation of the device of the present invention.

In the following description, the rate/time computers of the present invention are described with particular relation to utilization in a billiard parlor.

Referring now to the drawings:

FIG. 1 shows a block diagram of the operation and structure of the device of the present invention.

In FIG. 2, a selection assembly of an accessory register unit is depicted as having five pushbutton operated switches 10. The first four of these carrying the numerals 1 to 4 are for selecting a rate according to the number of players between 1 and 4. The fifth button is an off button. The switches are preferably translucent plastic and contain a bulb therein which is lighted when the button is actuated.

FIG. 3 depicts a register or counter for an accessory register unit. The register of FIG. 3 is depicted as having four revolving decimal counters 12 capable of registering from $0.00 to $99.99. Counters 12 can be reset to 0 by reset knob 13. While FIG. 3 depicts a mechanical register, it will be understood that an electronic register using "nixie" tubes or other electronic counting elements with visual readout can be used as well.

The selection assembly and the register unit are mounted together in housing 15 of FIG. 4.

FIG. 5 depicts 10 of the accessory register units mounted in a single cabinet 16, with a master register 17 which is not resettable, master register 19 for a daily tally, which is resettable by reset knob 20 and selector switch 52 for selecting a higher or lower hourly rate; e.g., day or night rates.

Figure 6:
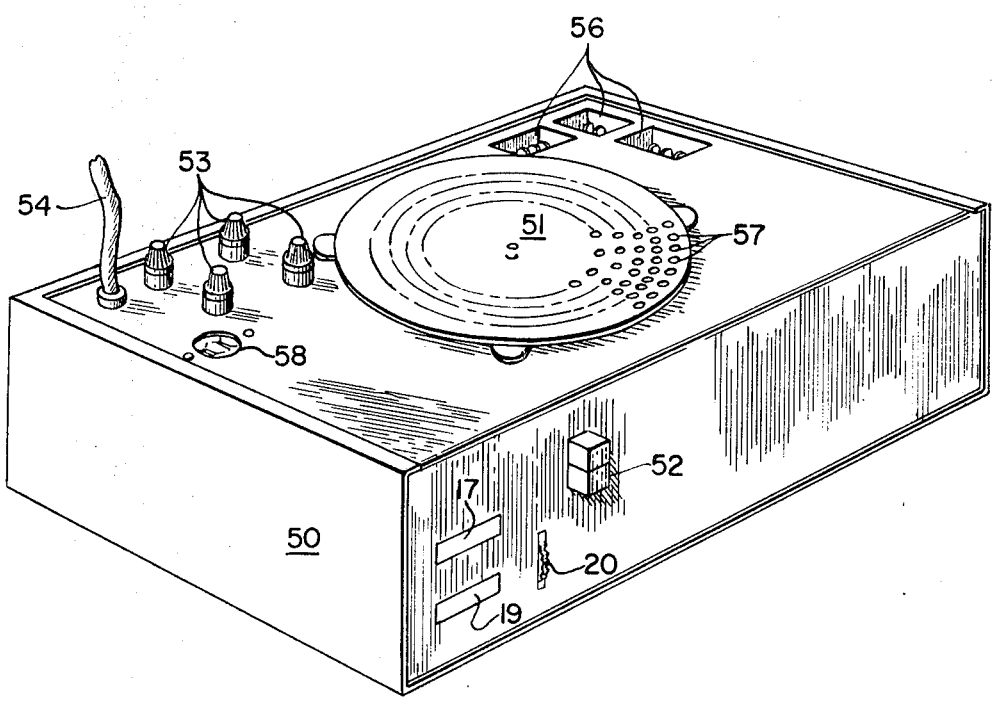
FIG. 6 is a perspective view of the pulse generator.

FIG. 6 illustrates an embodiment of the pulse generator 50 showing the punched disc 51 rotatably mounted on top of the pulse generator chassis. The disc 51 has a series of spaced holes 57 which are located in accordance with a preselected monetary rate value. On the underside of the disc 51, microswitches (not shown) engage the holes in the disc as the disc rotates. Also shown is power supply cord 54, fuses 53, AC convenience outlet 58 to which may be connected clock 18, for example. Also shown are counters 17 and 19, reset knob 20 and selector switch 52. Receptacles 56 provide for connection between the pulse generator and the accessory register units.

Figure 7:
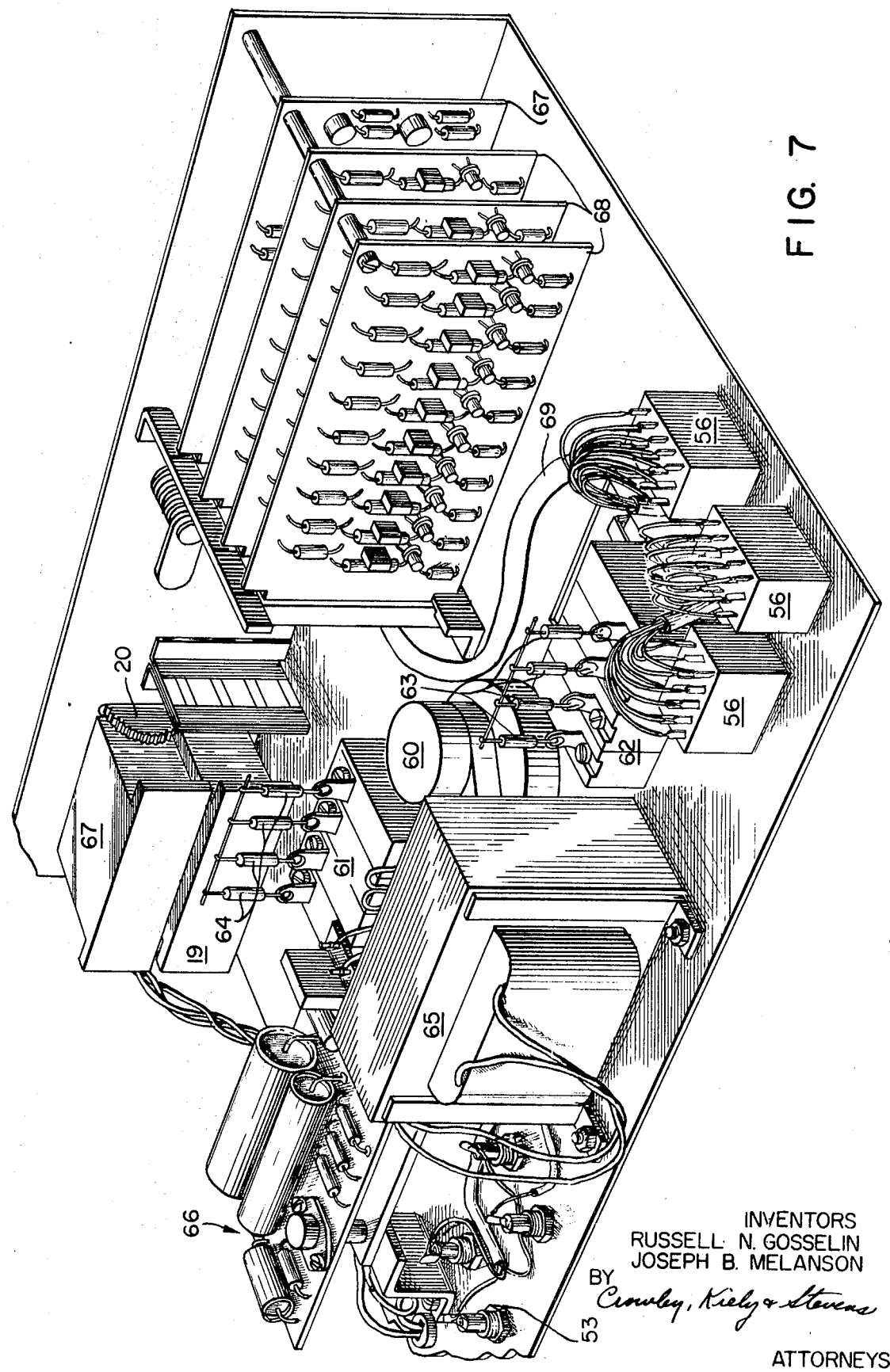
FIG. 7 is a perspective view of the underside of the pulse generator assembly of FIG. 5.

FIG. 7 shows the underside of the pulse generator as shown in FIG. 6. Electric motor 60 drives disc 51 at a preselected speed for the rates involved. For example, a rotational speed of the disc may be 1 revolution per hour with one band of holes representing a nickel, so that a disc with 20 holes would provide 20 pulses in 1 hour representing a rate of $1.00 per hour. As mentioned above, the rates desired may be preselected by the spacing and location of the holes in the disc.

A plurality of fingers, in the present case four, engage the holes in the disc as it rotates. The fingers are connected to microswitches 61 and 62. Two banks of microswitches are shown to correspond with the aforementioned day and night rates and provide for the selection of rates for one, two, three, or four players. Although only four are shown, it should be understood that it is within the scope of this invention to provide devices having any number of selector switches and microswitches to correspond to any number of players. It should be further understood that only one bank of microswitches would be operative at any time. Selector switch 52 provides for the actuation of one or the other.

Associated with microswitches 61 and 62 are capacitors 63 and 64, which are normally in a charged condition. As the fingers on the microswitches fall into the holes in the rotating disc, the particular capacitor is discharged into a transistor contained in master control board 67 which transistor will pulse all the register assemblies which have the button actuated corresponding to the number of players represented by the microswitch which has been tripped. By pulsing these drawers, a transistor in the drawer is also pulsed which advances the counter 12 the predetermined unit. Pulsing of the transistor in the drawer also sends a charge to a capacitor in memory units 68, of which three are shown each containing 10 banks to correspond to the various rates obtainable on the device. The memory units are composed of semiconductors, resistors, and capacitors in conventional solid state circuitry. Master control board 67 also contains a memory ring pulsing at a standard rate which sequentially tests each capacitor in the memory unit. If there is no charge in given capacitor then no pulse will be noted, i.e., the punch button in the register assembly corresponding to the capacitor in the memory bank will be in the off position or will not have indicated an advancement of the counter since the last time the memory ring tested the capacitor. If, however, the capacitor has been charged by virtue of a pulse input to the register assembly, then the memory ring will cause the capacitor to discharge, pulsing the master control circuit board actuating the drive for totalizer counters 17 and 18, i.e., the daily and permanent totalizers. Output plugs 56 provides for connection between pulse generator and the drawer assembly units. Although only three are shown, it should be understood that any number of outlet plugs could be employed depending upon the number of drawer assembly units.

The actuation of the microswitches 62, i.e., their engagement with the holes in the rotating disc 51 is of no effect unless the corresponding button 10 has been actuated in the register assembly unit. If, for example, the number one button had not been actuated in any of the units the pulse generated by microswitch 62 corresponding to the number one button would be generated and transmitted to the register assembly units but it would not be detected or acted on by any of the units.

Figure 8:
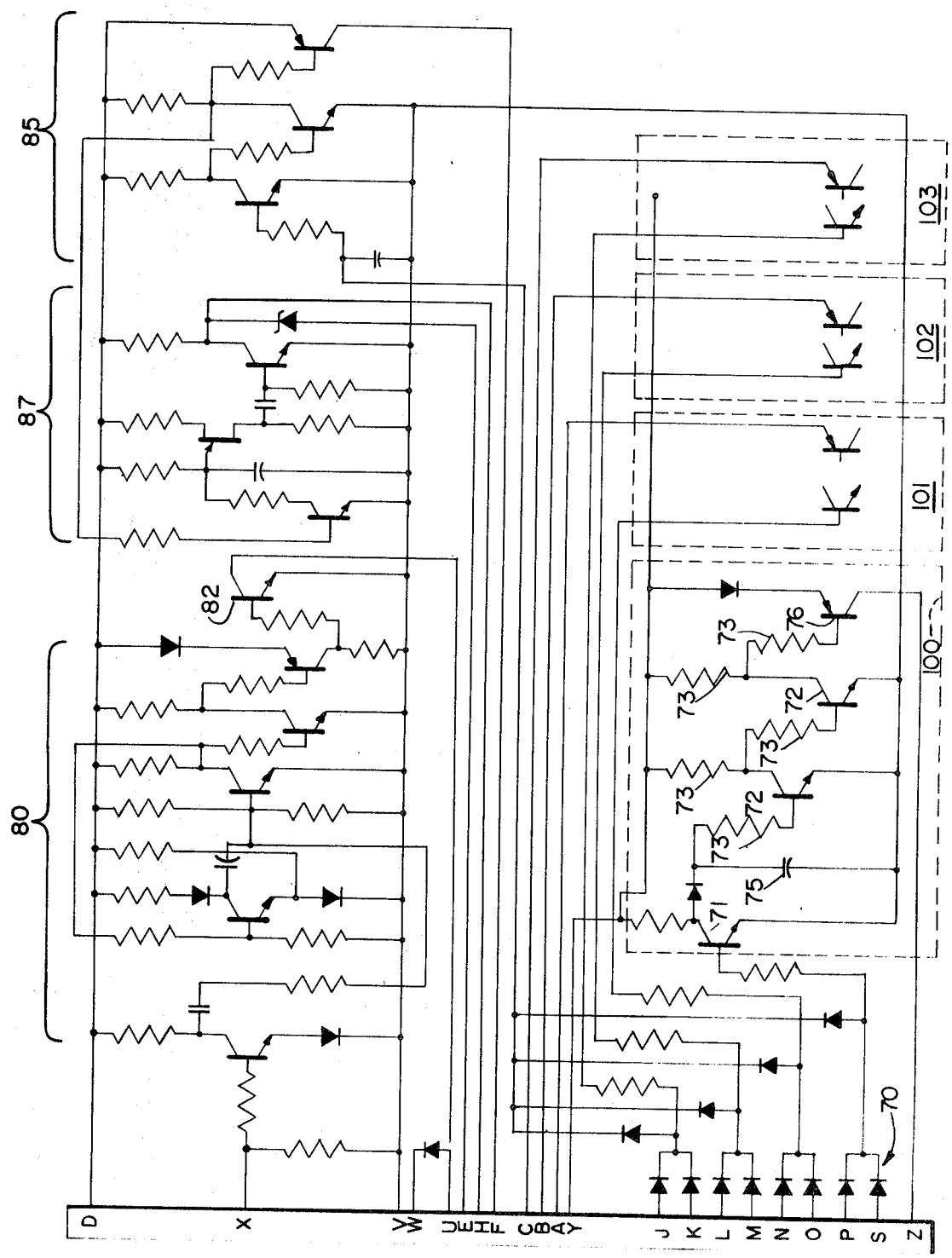
FIG. 8 is a schematic drawing of the master control unit.

FIG. 8 is a schematic representation of one embodiment of the master control circuit. The operation of the circuitry will be described in connection with one drawer assembly 100; other drawer assemblies 101, 102 and 103 are indicated but are not shown in detail. Diode 70 is adapted to receive a pulse from the discharge of capacitor 63 by the action of microswitch 62. The pulse actuates transistor 71 in drawer assembly 100 which in turn discharges capacitor 75. Resistors 73 and transistors 72 provide a time delay to register assembly transistor 76 which actuates the counter for the specified button (rate) selected. Transistor 76 also provides a pulse to the memory unit to record therein the indicated unit by charging the appropriate capacitor.

The master control circuit is also adapted to receive a pulse from the memory ring and includes circuitry 80 which provides a constant timed pulse to drive the totalizers in response to the drive transistor 82 and oscillation circuitry 83 to drive the memory ring to test the capacitors in the memory units. Also shown is gate control circuitry 85 which prevents false pulses from inducing errors into the counters by shutting off the totalizer drive while any pulses are being received by the master control switch.

Figure 9:
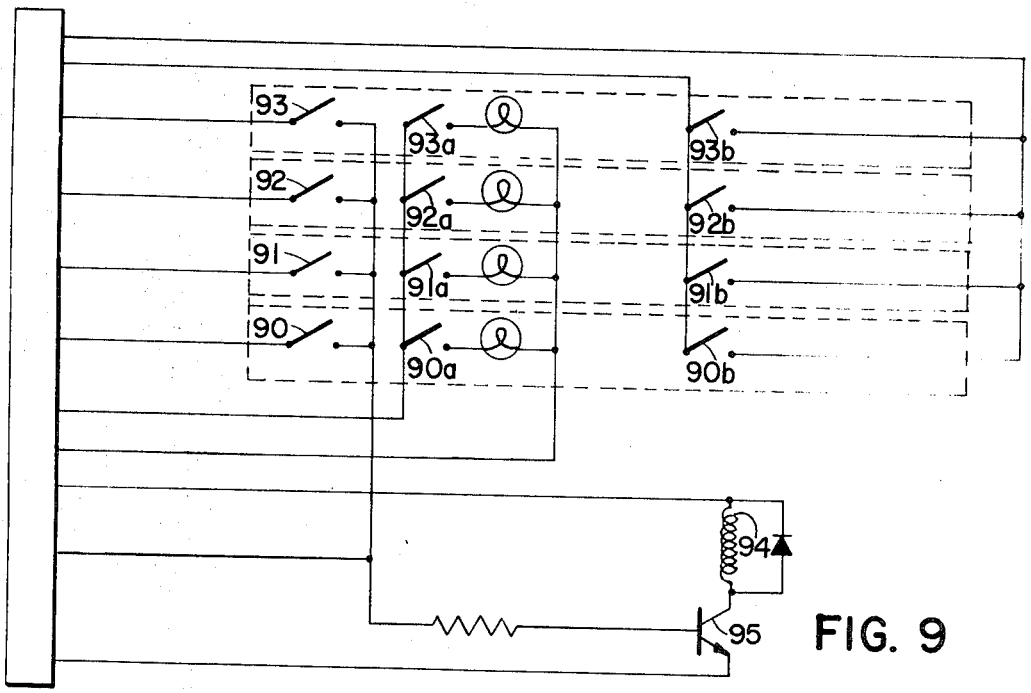
FIG. 9 is a schematic drawing of the selection assembly and register unit of FIGS. 1 and 2.

FIG. 9 is a schematic representation of one embodiment of the accessory register assembly unit. Switches 90, 91, 92, and 93 shown in the open position, correspond to switches 10 shown in FIG. 2 and are single pole switches which, when actuated, close the circuit between the pulse generator and the register assembly counter for the given drawer. In the open position, as shown, a pulse from the pulse generator would have no effect on the device. Assuming, for example, switch 90 was closed and a pulse was received from the pulse generator, the circuit would be completed actuating drive transistor 95 advancing counter 94 to the monetary unit represented by the closed switch. Also a pulse that drives transistor 95 would be transmitted to the memory unit. Also shown are indicator lights 90a, 91a, 92a, and 93a which are located in the heads of the switches 90, 91, 92 and 93. Also shown are switches 90b, 91b, 92b, and 93b which can turn on external units when switches 90, 91, 92, or 93 are actuated, for example, in the case of the billiard parlor, lights over the billiard table or, in the bowling alley, actuating the pin-setting device.

Figure 10:
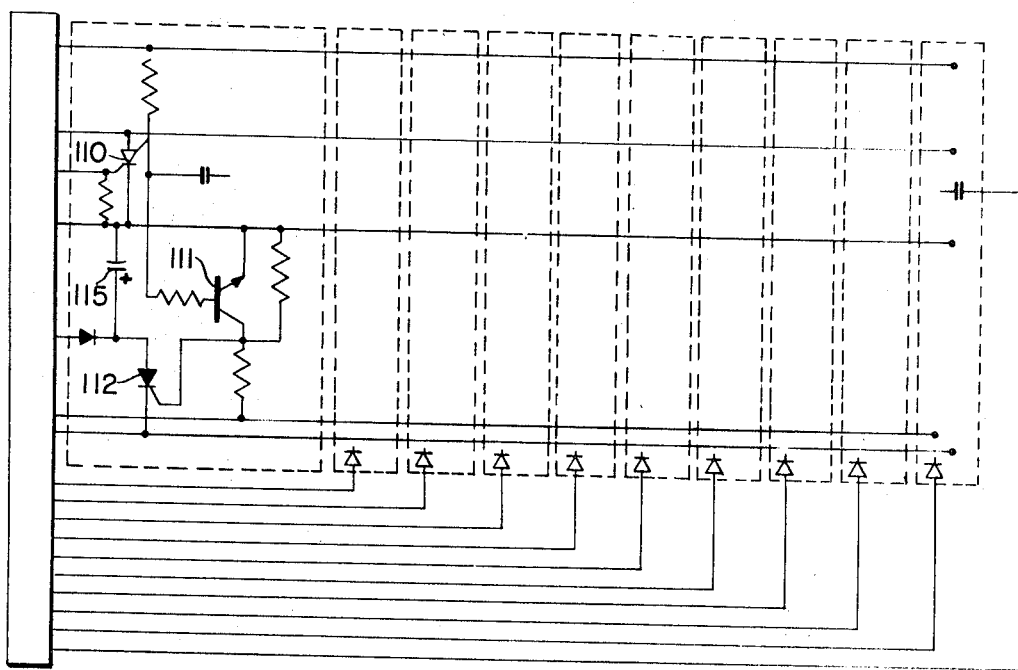
FIG. 10 is a schematic drawing of the memory unit.

FIG. 10 is a schematic representation of the memory unit. Only one unit of a bank of 10 is shown in detail. SCS switch 110 is pulsed at a standard rate and, in a predetermined sequence, pulses transistor 110 which actuates SCR switch 112 which tries to empty capacitor 115. If capacitor 115 is not charged, no pulse is generated to the totalizers. If, however, capacitor 115 is charged by virtue of a monetary unit being indicated to a register assembly which is transmitted to capacitor 115, then the discharge of said capacitor by SCR switch 112 will pulse a drive transistor, advancing the daily and permanent totalizers 17 and 19.

Electric power for the rate/time computer is suitably 115 volts 60 cycle AC and line 54 is for connection to a standard grounded receptacle. No main on-off switch is depicted since it is intended that the master unit will normally run continuously. Fuses 53 in the master unit protect against excessive current in the line and defective short circuit.

Clock 18 connected primarily for indicating nonoperating time lapses of the equipment. It is intended that the clock be inaccessible to anyone but the proprietor, i.e., contained in a locked compartment, so that an attendant cannot cheat the system by pulling the plug.

Transformer 65 with its primary winding connected across the input line provides isolation and reduced voltage for the power supply board and also provides low voltage AC to operate indicator lights in the drawer accessory register units.

Many possible combinations of the circuitry depicted are readily obvious and all such combinations are conceived as part of the present invention. Likewise it will be understood that the master pulse generator can take many forms.

Thus, while the invention has been described in relation to specific embodiments and uses, many variations and utilizations of the inventive concepts are contemplated and it is intended to cover the invention broadly within the scope and spirit of the appended claims.

We claim:
1. A rate/time computer for continuously registering monetary charges as a function of rate and time comprising:
   a. a master unit with a master totalizing register;
   b. pulse generating means adapted to provide electrical pulses at a plurality of frequencies, each frequency deter- minative of a rate, said pulse generating means disposed within the master unit;

c. plural selection means disposed within said master unit adapted independently to select pulses each at a given one of said frequencies each said selection means related to a chargeable activity;

d. detection means associated with each of said selection means for detecting said pulses at the selected frequency; and e. individual register means associated with each of said detection means for counting the number of pulses detected by the respective detection means and continuously registering the monetary value chargeable to the related chargeable activity, and further wherein said detection means and said individual register means are incorporated in a plurality of accessory units, each accessory unit containing one selection means, one detection means, and one individual register, and wherein the master totalizing register continuously registers the sum total of the individual registers in each accessory unit.

2. A rate/time computer according to claim 1 wherein said pulse generating means comprises a circular disc having a plurality of holes therein, said disc being rotatable at a predetermined rate and a series of electrical switches connected in electrical circuits with feeler levers adapted to engage said holes whereby each switch provides a pulse of current in the connected electrical circuit as its respective feeler lever engages a hole.

3. A rate/time computer according to claim 2 wherein said plural selection means comprise a plurality of selection switches for completing an electrical path between a selected electrical switch of said pulse generating means and said detection means.

4. A rate/time computer according to claim 2 wherein said pulse of current is provided by the discharge of a capacitor.

5. A rate/time computer according to claim 1 wherein said detection means comprises single-throw switching contact, and a drive transistor, said contact adapted to connect said transistor across an electrical source responsive to a pulse from said pulse generating means and adapted to actuate the counters of said register means.

6. A rate/time computer as defined in claim 5 wherein said contact is also adapted to connect said drive transistor to a capacitor in a memory unit whereby said capacitor is charged in response to a pulse from said pulse generating means.

7. A rate/time computer as defined in claim 6 where said memory unit comprises a plurality of capacitors corresponding to each of said detecting means; means for providing a constant timed pulse which actuates in sequence switches associated with each of said capacitors adapted to discharge each of said capacitors, master totalizer counters associated with said capacitors, whereby each capacitor is tested in sequence and charged capacitors are discharged, actuating said master totalizers.

8. A rate/time computer for continuously registering monetary charges as a function of rate and time comprising:

a. a master unit with a master totalizing register;

b. pulse generating means adapted to provide electrical pulses at a plurality of frequencies, each frequency determinative of a rate, said pulse generating means disposed within the master unit;

c. plural selection means in communication with said pulse generating means and adapted independently to select pulses each at a given one of said frequencies, each said selection means related to a chargeable activity;

d. detection means in communication with each of said selection means for detecting the pulses of one or more of the selected frequencies;

e. individual register means in communication with each of said detection means for counting the number of pulses detected and continuously registering the monetary value chargeable to the related chargeable activity; each individual register means including means to be individually or cumulatively responsive to one or more of the plurality of frequencies;

f. a memory unit which comprises a plurality of capacitors corresponding to each of said detecting means;

g. means for providing a constant timed pulse which actuates in sequence switches associated with each of said capacitors adapted to discharge each of said capacitors and master totalizer counters associated with said capacitors whereby each capacitor is tested in sequence and the charged capacitors are discharged actuating said master totalizers to provide a cumulative total of all detected pulses.